(12) United States Patent
Agevik et al.

(10) Patent No.: US 8,072,432 B2
(45) Date of Patent: Dec. 6, 2011

(54) IMAGE SENSE TAGS FOR DIGITAL IMAGES

(75) Inventors: Markus Agevik, Malmö (SE); Anders Hansson, Klågerup (SE)

(73) Assignee: Sony Ericsson Mobile Communications AB, Lund (SE)

( * ) Notice: Subject to any disclaimer, the term of this patent is extended or adjusted under 35 U.S.C. 154(b) by 935 days.

(21) Appl. No.: 12/014,358

(22) Filed: Jan. 15, 2008

(65) Prior Publication Data

US 2009/0179866 A1 Jul. 16, 2009

(51) Int. Cl.
*G06F 3/041* (2006.01)
(52) U.S. Cl. .................. 345/173; 178/18.04; 178/18.06
(58) Field of Classification Search .......... 345/156–162, 345/173–178; 178/18.01–18.09
See application file for complete search history.

(56) References Cited

U.S. PATENT DOCUMENTS

| 6,231,032 | B1 | 5/2001 | Ivey, Jr. |
| 7,098,891 | B1 | 8/2006 | Pryor |
| 2001/0035880 | A1 | 11/2001 | Musatov et al. |
| 2004/0125120 | A1 | 7/2004 | Weiner |
| 2007/0086773 | A1* | 4/2007 | Ramsten et al. .............. 396/287 |
| 2007/0123390 | A1* | 5/2007 | Mathis .............................. 482/8 |
| 2007/0146315 | A1* | 6/2007 | Ide .................................. 345/156 |
| 2008/0136990 | A1* | 6/2008 | Kimura ........................... 349/46 |
| 2008/0158223 | A1* | 7/2008 | George et al. ................. 345/418 |

FOREIGN PATENT DOCUMENTS

| EP | 1376317 | 1/2004 |
| WO | 2007/042460 | 4/2007 |

OTHER PUBLICATIONS

International Search Report for corresponding application No. PCT/EP2008/058957 completed Sep. 17, 2009.

* cited by examiner

*Primary Examiner* — Vijay Shankar
(74) *Attorney, Agent, or Firm* — Renner, Otto, Boisselle & Sklar, LLP

(57) ABSTRACT

A method and apparatus for presenting the sense of an image is disclosed. First, a digital image is acquired and then various sensing tags are assigned to various sections of the digital image. The digital image is displayed on a screen. It is determined when and where a user touches the screen which corresponds to a section of the digital image. If a sensing tag has been assigned to the touched section of the digital image, the tagged sense is provided to the user.

25 Claims, 6 Drawing Sheets

IMAGE SENSE TAGS FOR DIGITAL IMAGES

TECHNICAL FIELD OF THE INVENTION

The present invention relates to digital pictures and more particularly to a method and apparatus for displaying digital pictures in such a manner so as to appeal to a plurality of senses.

DESCRIPTION OF RELATED ART

Over the past decade, digital photography has become very popular with consumers. Digital cameras have been incorporated into many of the latest cell phones and PDA's. Digital photography has several important advantages over traditional film photography. First, the user can see the digital photograph on a display screen of the digital camera just after the picture is taken. If there is a problem with the picture, for example, one or more people in the picture have their eyes shut, the user knows to take another picture. Furthermore, since digital pictures are simply stored in memory, it is easy to take many pictures and then go back and delete the photographs that the user does not want. Finally, it is easy to manipulate digital pictures e.g., zoom in, zoom out after the picture has been taken.

In addition to printing out digital pictures onto paper like traditional photographs, digital photographs can be displayed on almost any computer screen, such as a PC, digital camera, cell phone, digital picture frame, etc. The digital picture is simply stored in a memory attached to the screen and then displayed on the screen in a known manner.

However, the current available screen for displaying digital photographs only present the digital photograph in such a manner to appeal to a single human sense, namely sight.

Thus, there is a need for a method and apparatus for displaying digital pictures in such a manner so that digital picture is displayed to a plurality of senses such as sight, sound, taste, touch and/or smell.

SUMMARY OF THE INVENTION

According to some embodiments of the invention, a method for presenting the sense of an image, comprising the steps of: acquiring a digital picture; assigning various sensing tags to various sections of the picture; displaying the picture on a screen; detecting when a user touches the screen which corresponds to a section of the picture; determining if a sensing tag has been assigned to the touched section of the picture; providing the tagged sense to the user.

According to another embodiment of the invention an apparatus for presenting the sense of an image, comprising: means for acquiring a digital picture; a processor for assigning various sensing tags to various sections of the picture; a screen for displaying the tagged picture; wherein the screen detects when a user touches the screen which corresponds to a section of the picture; the processor determining if a sensing tag has been assigned to the touched section of the picture; means for providing the tagged sense to the user.

Further embodiments of the invention are defined in the dependent claims.

It is an advantage of embodiments of the invention that digital photographs can be displayed on a screen in such a manner as to stimulate various human senses.

BRIEF DESCRIPTION OF THE DRAWINGS

Further objects, features and advantages of embodiments of the invention will appear from the following detailed description of the invention, reference being made to the accompanying drawings, in which.

DETAILED DESCRIPTION OF EMBODIMENTS

Figure 1A:
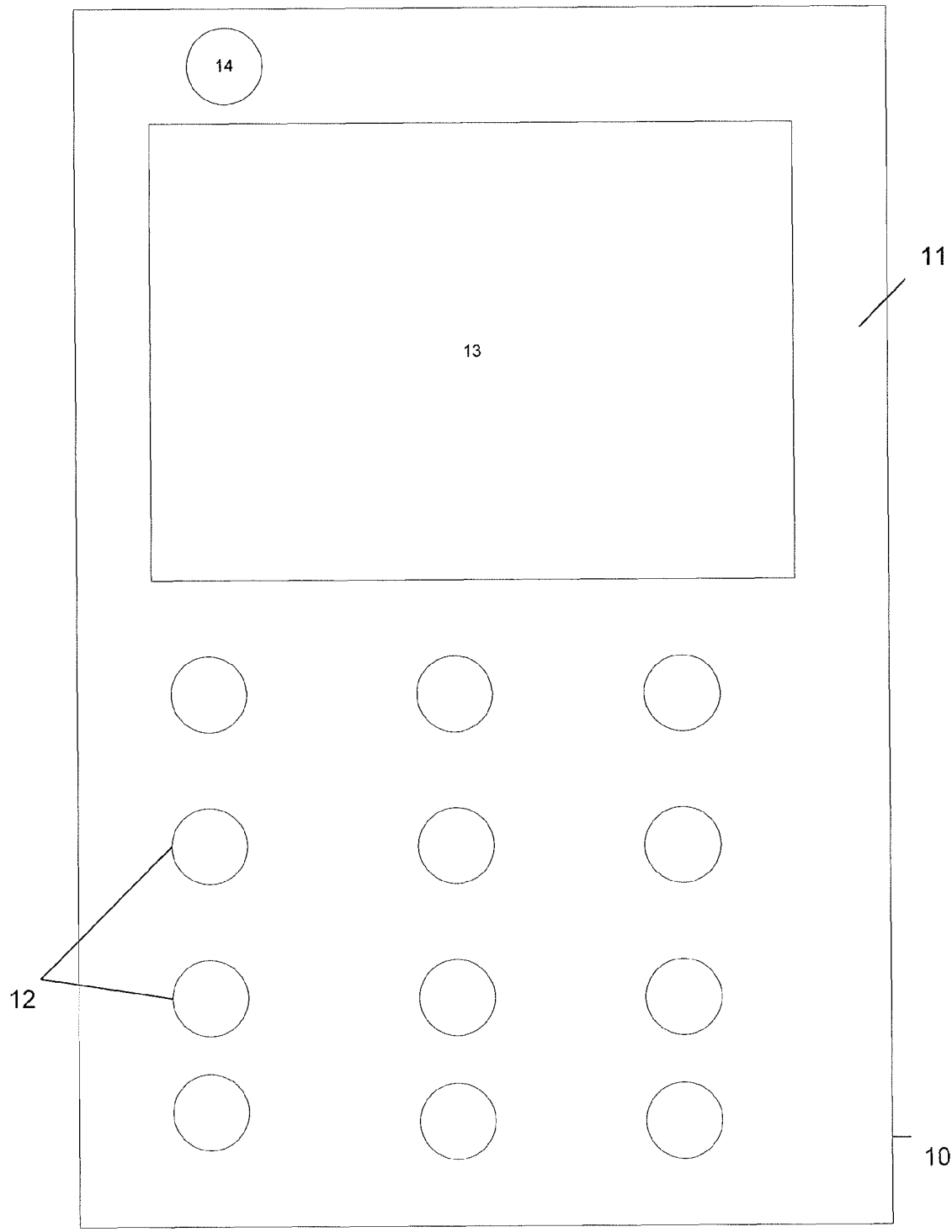
FIGS. 1A-B illustrates a hand-held radio communication terminal including a digital camera and a display according to some embodiments of the invention.

Specific illustrative embodiments of the invention will now be described with reference to the accompanying drawings. This invention may, however, be embodied in many different forms and should not be construed as limited to the embodiments set forth herein. Rather, the disclosed embodiments are provided so that this specification will be thorough and complete, and will fully convey the scope of the invention to those skilled in the art. The terminology used in the detailed description of the particular embodiments illustrated in the accompanying drawings is not intended to be limiting of the invention. Furthermore, in the drawings like numbers refer to like elements.

According to one embodiment of the invention, digital images may be displayed on a plurality of electronic devices which include a touch screen. For example, the electronic devices may include computer screens, cell phones, digital picture frames, etc., and the invention is not limited thereto.

FIG. 1A illustrates an electronic device in the form of a portable communication terminal 10, such as a mobile telephone, which can be used according to some embodiments of the invention. Terminal 10 includes a support structure 11 including a housing, and a user interface including a keypad or keyboard 12 and a screen 13. The terminal 10 may also include an audio interface including a microphone and a speaker, radio transceiver circuitry, an antenna, a battery, and a microprocessor system including associated software and data memory for radio communication, all carried by support structure 11 and contained within the housing. In addition to these elements, device 10 also includes a digital camera 14, an aperture of which is indicated in FIG. 1A As shown in FIG. 1A, the aperture of the camera 14 and the screen 13 may be arranged such that both are visible from a common viewing location. For example, both the aperture of the camera 14 and the screen 13 may be arranged on the same side of the housing 11. This way, the camera 14 may be aimed at a user while the user views the screen 13. Accordingly, a communication terminal 10 may be used for video telephony.

Figure 1B:
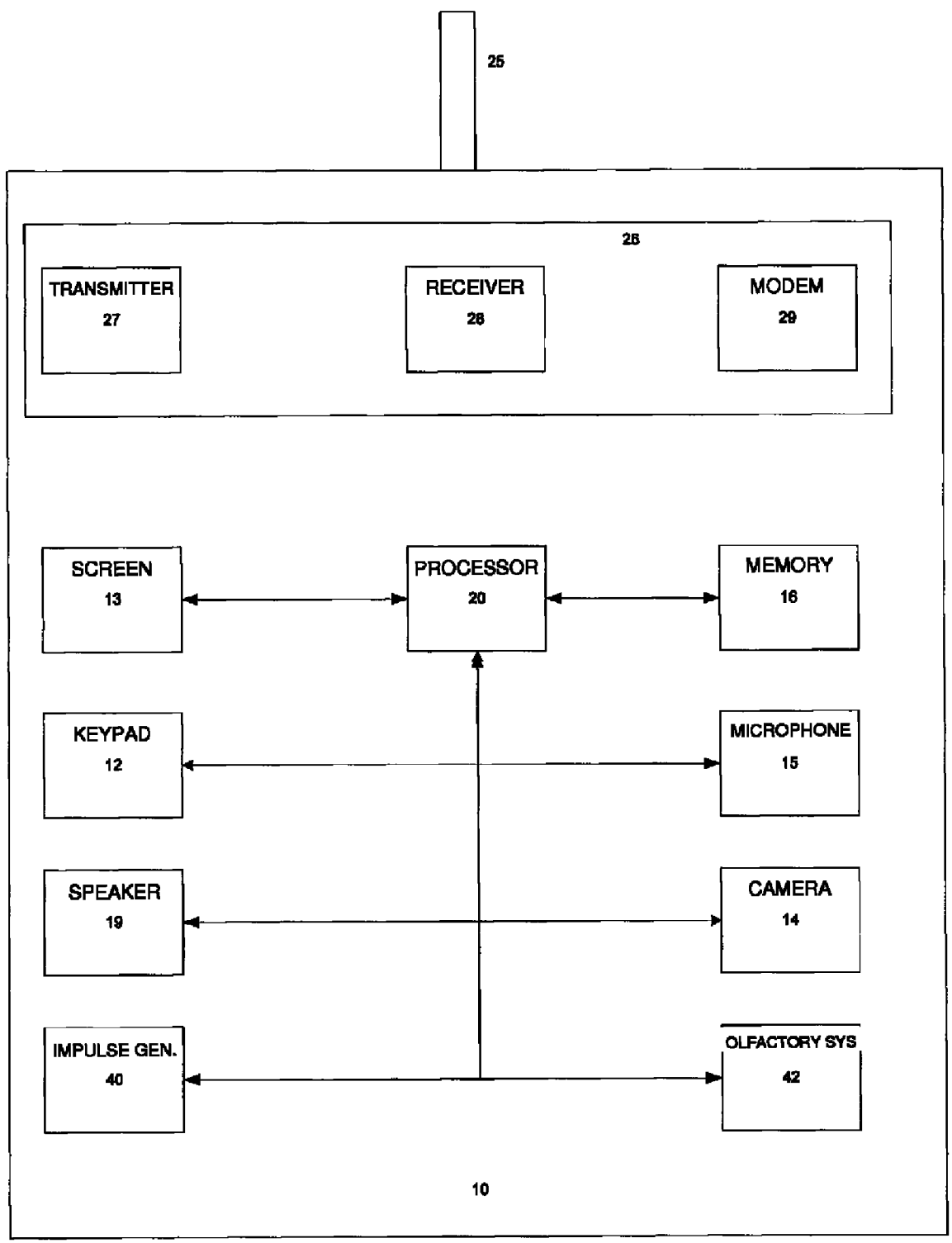

Embodiments of the present invention may be further described with reference to the schematic illustration of a communication terminal 10 shown in FIG. 1B. Referring now to FIG. 1B, an exemplary communication terminal 10, in accordance with some embodiments of the present invention, includes a keypad 12, a screen 13, a transceiver 26, a memory 16, a microphone 15, and a speaker 19, and a camera 14 that communicate with a processor 20. The screen 13 may be a touch screen but the invention is not limited thereto. The transceiver 26 typically includes a transmitter circuit 27, a receiver circuit 28, and a modem 29, which cooperate to transmit and receive radio frequency signals to remote transceivers via an antenna 25. The radio frequency signals transmitted between the communication terminal 10 and the remote transceivers may comprise both traffic and control signals (e.g. paging signals/messages for incoming calls), which are used to establish and maintain communication with another party or destination.

The memory 16 may be a general purpose memory that is used to store both program instructions for the processor 20 as well as data, such as audio data, video data, configuration data, and/or other data that may be accessed and/or used by the processor 20. The memory 16 may include a nonvolatile read/write memory, a read-only memory and/or volatile read/write memory.

Figure 2:
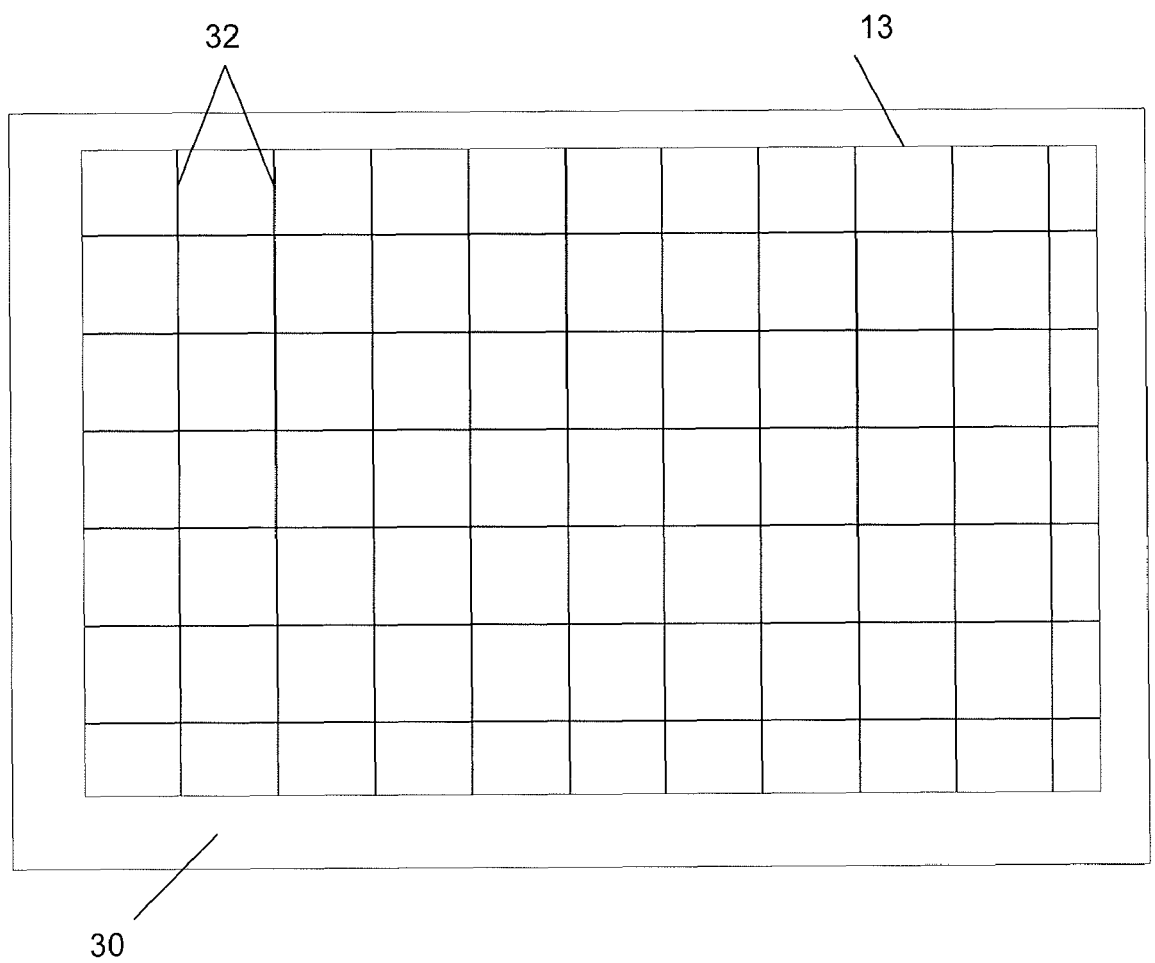
FIG. 2 illustrates a clear plastic cover over a touch screen according to one embodiment of the invention.
Figure 3:
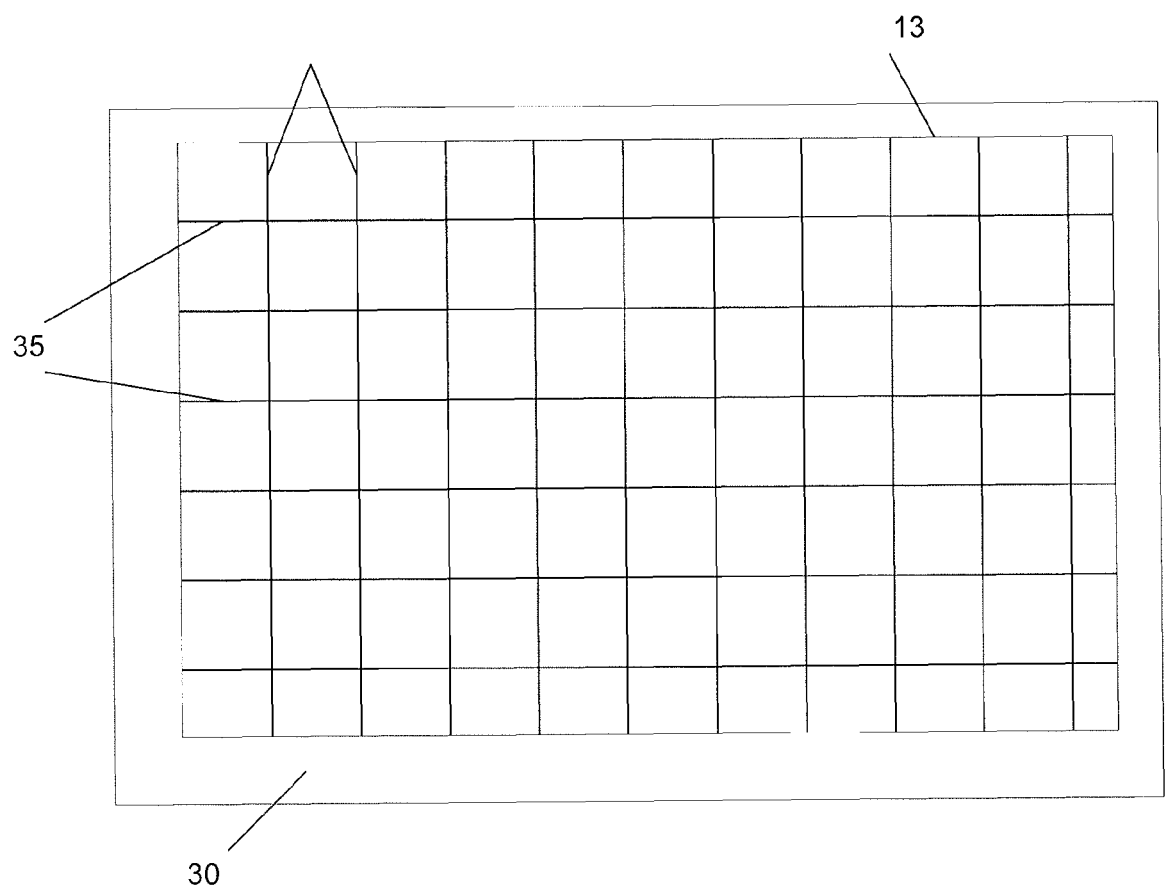
FIG. 3 illustrates a clear plastic cover according to one embodiment of the invention.

According to one embodiment, a cover 30 is placed over the touch screen 13 as illustrated in FIG. 2. The cover 30 may be constructed out of a clear plastic material which can change it's texture based on electrical impulses which are applied to sections of the cover 30, but the invention is not limited thereto. Furthermore, the touch screen 13 and the cover 30 may be integrated into a single screen which can perform all of the functions of the cover described below. The electrical impulses are applied to a series of wires 32 embedded in the cover 30. In addition, a net of heating wires 34 and cooling wires 35 can also be embedded in the cover 30 or placed between the touch screen 13 and the cover 30 as illustrated in FIG. 3. In the alternative, hot and cold air can be used to convey the sense of hot and cold and the invention is not limited thereto. The operation of the cover is controlled by the processor 20. The operation of the cover 30 will be described in more detail below with reference to FIG. 4.

Figure 4:
FIG. 4 is a flow chart describing the process for displaying a digital image according to one embodiment of the invention.
Figure 5:
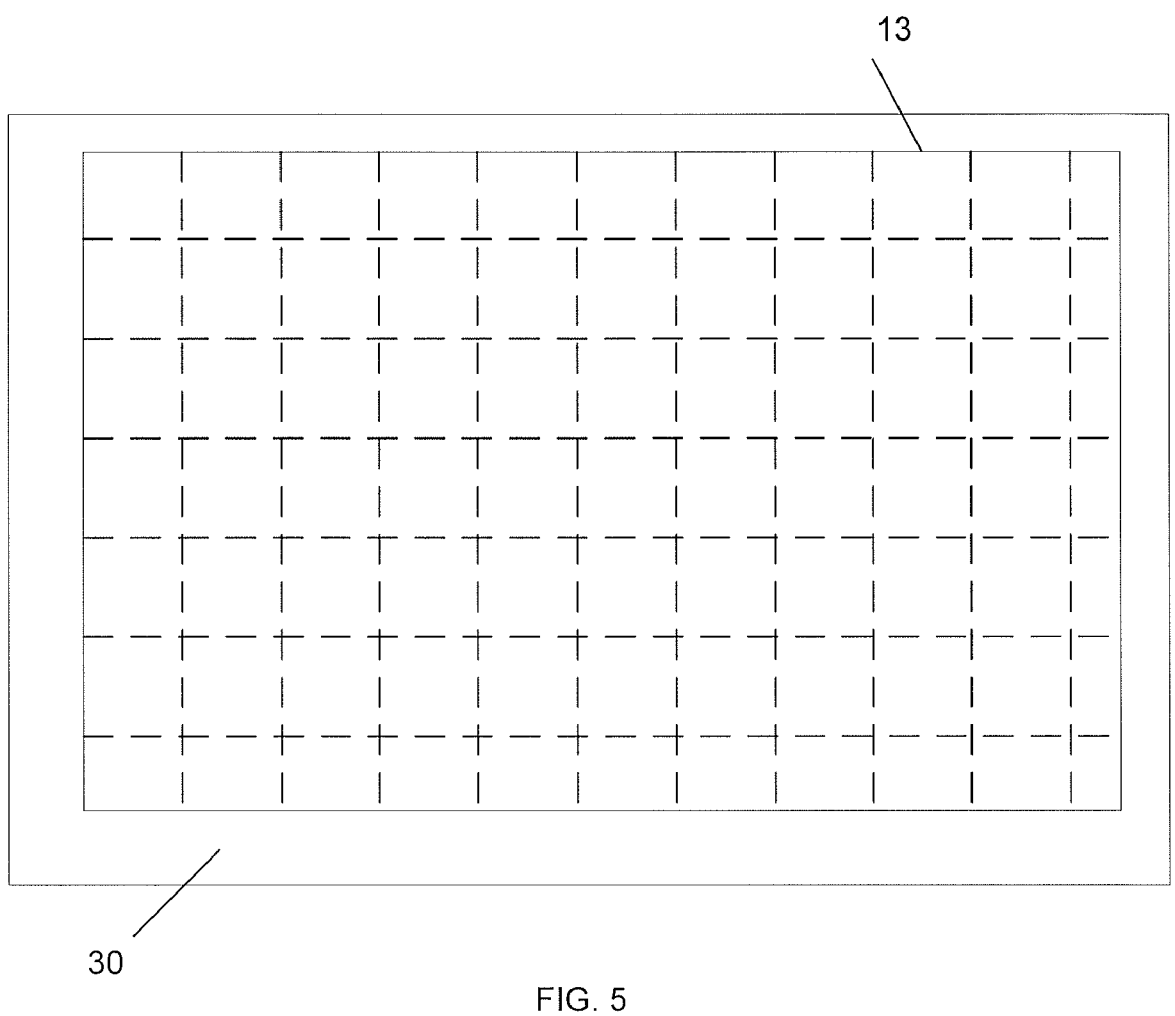
FIG. 5 illustrates a digital image on a touch screen according to one embodiment of the invention.

A method for presenting the sense of an image will now be described with reference to FIG. 4. In step 401, a digital image is acquired by the camera 14. A user can either take the digital image using the camera 14 or a digital image can be downloaded to the camera 14 from an external computer. Once acquired, the digital image is displayed on the touch screen 13 in step 403. First, the digital image is divided into a plurality of sections in step 405 as illustrated in FIG. 5. It will be understood that the sections can be of any size and the invention is not limited thereto. While the digital image is being displayed, sensing tags can be added to sections of the digital image. The sensing tags may include but are not limited to, hot, cold, rough, smooth, hard, soft, sound, taste and smell sensing tags. It will be understood that there can be a plurality of different sound, smell and taste sensing tags which correspond to various sounds, smells and tastes which are stored in the portable communication terminal 10.

According to one embodiment of the invention, a person manually assigns the appropriate sensing tags to the various sections of the digital image. For example, the person could use a cursor to assign the various sensing tags to the section of the digital image but the invention is not limited thereto. One or more sensing tags may be assigned to a single section of the digital image. For example, sections of the digital image which depict people may be assigned sensing tags for soft and warm, while sections of the digital image which depict a house may be assigned a sensing tag for hard. Furthermore, a digital image of a beach and an ocean may have hard and hot sensing tags assigned to the beach while cold and soft sensing tags can be assigned to the ocean. In addition, an audio tag featuring crashing surf may be assigned to the sections of the digital picture showing the waves crashing onto the beach. Audio tags featuring seagulls can also be assigned to any section of the digital image which shows a seagull. Finally, a sensing tag for the smell of a beach may be assigned to all or part of the sections of the digital image.

In this embodiment of the invention, all of the possible sensing tags may be shown on a pop up list from which the user may make the appropriate selections. The list of possible sensing tags will of course depend on the different sounds and smells that the terminal 10 can generate and on the touch capabilities of the cover 30. In addition, various default sensing tags can be applied initially to the entire digital image. For example, all sections of the digital image may be initially assigned hard and cold sensing tags and the invention is not limited thereto.

In an alternative embodiment of the invention, image recognition software can be used to assign the sensing tags to the digital image. In this embodiment, the processor 20 analyzes the image using the image recognition software and predetermined sensing tags are assigned to the various features of the digital image.

Once the digital image has been tagged either manually or automatically in step 407, the tagged digital image is stored in the memory 16 in step 409 for future display. It will be understood that a tagged digital image may be downloaded to the terminal 10 from an external computer and stored in the memory 16.

When the user selects a tagged digital image for display, the processor 20 displays the tagged digital image on the touch screen 13, in step 411. At this point, the terminal 10 may generate various sounds or smells if the entire or part of the digital image has been tagged by sound and/or smell tags. These sounds and smells may last for a predetermined period of time or may last for the duration of displaying the digital image. It will be understood that several tags can be played at the same time and they do not need to be activated by touch. This can be calculated in advance or in real-time.

The touch screen 13 detects when and where the user touches the cover 30 over the touch screen 13 in step 413. The processor 20 then determines the section(s) of the displayed digital image which is being touched and determines if the touched section(s) has been tagged by any sensing tags in step 415.

If at least one sensing tag has been applied to the section being touched, the processor 20 causes the appropriate response to be generated in step 409. For example, if the sensing tag is for either hot or cold, the processor 20 operates the appropriate heating and cooling elements 34, 35 in the terminal to generate the response to the section(s) of the cover being touched. If the sensing tag is for smooth or rough and/or hard and soft, the processor 20 signals an electrical impulse generator 40 to generate the appropriate response to the section(s) of the cover being touched. If the sensing tag is for an audio sound, the processor 20 selects the tagged sound and sends it to the speaker 19. If the sensing tag is for a smell, the processor 20 instructs the olfactory system 42 to produce the correct smell. The generated responses continue for a predetermined period of time or until the user either removes their finger/hand from the cover 30 or moves their finger/hand to a new section of the image. The different sensing tags may be predetermined tags or user defined tags in alternative embodiments. Moreover, the a tag may appear as a combination of one or more predetermined and/or user defined tags.

The present invention has been described above with reference to specific embodiments. However, other embodiments than the above described are equally possible within the scope of the invention. Different method steps than those described above, performing the method by hardware or software or a combination of hardware and software, may be provided within the scope of the invention. It should be appreciated that the different features and steps of the invention may be combined in other combinations than those described. The scope of the invention is only limited by the appended patent claims.

What is claimed is:

1. A method for presenting the sense of an image, comprising the steps of:
   acquiring a digital image;
   assigning various sensing tags to various sections of the digital image, wherein the sensing tags relate to sight, touch, sound, taste and smell;
   displaying the digital image on a screen;
   detecting when and where a user touches a cover over the screen which corresponds to a section of the digital image;
   determining if a sensing tag has been assigned to the touched section of the digital image;
   providing the tagged sense to the user.

2. The method according to claim 1, wherein the user assigns the various sensing tags to the digital image.

3. The method according to claim 1, wherein an image recognition algorithm assigns the various sensing tags to the digital image.

4. The method according to claim 1, wherein said screen is a touch screen.

5. The method according to claim 1, wherein a cover is provided over the screen.

6. The method according to claim 5, wherein touch sensing tags indicate whether the cover on the touch screen should be hard or soft, hot or cold and/or smooth or rough.

7. The method according to claim 6, wherein the tagged sense is provided to the user where the user is touching the cover.

8. The method according to claim 1, wherein the sound sensing tags correspond to recorded sounds which can be played for the user.

9. The method according to claim 1, wherein the smell sensing tags correspond to stored aromas which can be released from the apparatus.

10. The method according to claim 6, wherein different electrical impulses are applied to a section of the cover on the touch screen to make the cover hard or soft, and/or smooth or rough according to the touch sensing tags.

11. The method according to claim 6, wherein cooling means generate cold sections on the cover according to the touch sensing tags.

12. The method according to claim 6, wherein heating means generate heated sections on the cover according to the touch sensing tags.

13. An apparatus for presenting the sense of an image, comprising:
   means for acquiring a digital image;
   a processor for assigning various sensing tags to various sections of the digital image;
   the screen for displaying the tagged digital image, wherein the screen detects when and where a user touches the screen which corresponds to a section of the digital image;
   the processor for determining if a sensing tag has been assigned to the touched section of the digital image;
   means for providing the tagged sense to the user.

14. The apparatus according to claim 13, wherein the user assigns the various sensing tags to the digital image.

15. The apparatus according to claim 13, wherein an image recognition algorithm assigns the various sensing tags to the digital image.

16. The apparatus according to claim 13, wherein the sensing tags relate to sight, touch, sound, taste and smell.

17. The apparatus according to claim 13, wherein the screen is a touch screen.

18. The apparatus according to claim 13, further comprising: a cover which is provided over the screen.

19. The apparatus according to claim 18, wherein touch sensing tags indicate whether the cover on the screen should be hard or soft, hot or cold and/or smooth or rough.

20. The apparatus according to claim 19, wherein the tagged sense is provided to the user where the user is touching the cover.

21. The apparatus according to claim 16, wherein the sound sensing tags correspond to recorded sounds which can be played for the user.

22. The apparatus according to claim 16, wherein the smell sensing tags correspond to stored aromas which can be released from the apparatus.

23. The apparatus according to claim 19, wherein different electrical impulses are applied to a section of the cover on the touch screen to make the cover hard or soft, and/or smooth or rough according to the touch sensing tags.

24. The apparatus according to claim 19, wherein cooling means generate cold sections on the cover according to the touch sensing tags.

25. The apparatus according to claim 19, wherein heating means generate heated sections on the cover according to the touch sensing tags.

* * * * *